(12) United States Patent
Cudak et al.

(10) Patent No.: US 9,917,975 B2
(45) Date of Patent: Mar. 13, 2018

(54) FACSIMILE REQUIREMENTS MONITORING

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 20 days.

(21) Appl. No.: 13/905,089

(22) Filed: May 29, 2013

(65) Prior Publication Data
US 2014/0355071 A1    Dec. 4, 2014

(51) Int. Cl.
| H04N 1/00 | (2006.01) |
| H04N 1/32 | (2006.01) |
| H04N 1/40 | (2006.01) |

(52) U.S. Cl.
CPC ....... *H04N 1/32042* (2013.01); *H04N 1/3263* (2013.01); *H04N 1/32133* (2013.01); *H04N 1/32657* (2013.01)

(58) Field of Classification Search
CPC .......... G06K 9/00154; G06K 9/00442; G06K 9/00449; G06K 9/2054; G06K 9/2063;
(Continued)

(56) References Cited

U.S. PATENT DOCUMENTS 5,051,779 A * 9/1991 Hikawa ................ G03G 15/507
235/437
5,652,794 A    7/1997 Lepetit et al.
(Continued)

FOREIGN PATENT DOCUMENTS

| DE | 019924144 A1 | 12/1999 |
| JP | 363245059 A | 10/1988 |
| JP | 07046403 | 2/1995 |

OTHER PUBLICATIONS

K. Mimura et al; "Guidelines for Optional Services for Internet Fax Gateways"; Aug. 1, 2005); The Internet Society (2005); IP.com No. IPCOM000127582D.

*Primary Examiner* — Chad Dickerson
(74) *Attorney, Agent, or Firm* — Steven M. Greenberg, Esq.; CRGO Law

(57) ABSTRACT

Embodiments of the present invention provide a method, system and computer program product for facsimile requirements monitoring during facsimile transmission of a form. In an embodiment of the invention, a method of facsimile requirements monitoring during facsimile transmission of a form is provided. The method includes loading a document directed for facsimile transmission by a facsimile data processing system, identifying within the document a facsimile requirement that a particular location within the document include end user supplied data, determining whether or not the particular location specified by the facsimile requirement includes end user supplied data, and generating an error message in the facsimile device responsive to a determination that the particular location lacks any end user supplied data.

15 Claims, 1 Drawing Sheet

(58) Field of Classification Search
CPC .............. G06F 17/243; H04N 1/00352; H04N 1/00355; H04N 1/00358; H04N 1/0036; H04N 1/00363; H04N 1/00366; H04N 1/00368; H04N 1/00376; H04N 1/00875; H04N 1/00413; H04N 1/00461; H04N 1/0049; H04N 1/32042
USPC ...... 358/1.11–1.18, 500, 537–540, 441, 440, 358/400–404, 452, 453, 462; 382/312, 382/313, 317; 715/221–226, 268
See application file for complete search history.

(56) References Cited

U.S. PATENT DOCUMENTS

| | | | |
|---|---|---|---|
| 5,748,809 A * | 5/1998 | Hirsch | G06K 9/00449 382/175 |
| 7,289,685 B1 * | 10/2007 | Wolff et al. | 382/317 |
| 2002/0122189 A1 * | 9/2002 | Salgado | G06K 15/02 358/1.6 |
| 2004/0103367 A1 | 5/2004 | Riss et al. | |
| 2005/0231746 A1 * | 10/2005 | Parry | H04N 1/00352 358/1.13 |
| 2008/0291502 A1 * | 11/2008 | Horikawa | G06K 9/2054 358/448 |
| 2009/0244638 A1 | 10/2009 | Evevsky | |
| 2010/0149593 A1 | 6/2010 | Dowling et al. | |
| 2014/0355068 A1 * | 12/2014 | Cudak | H04N 1/32149 358/3.28 |
| 2015/0163128 A1 * | 6/2015 | Cudak | H04L 45/22 709/239 |

* cited by examiner

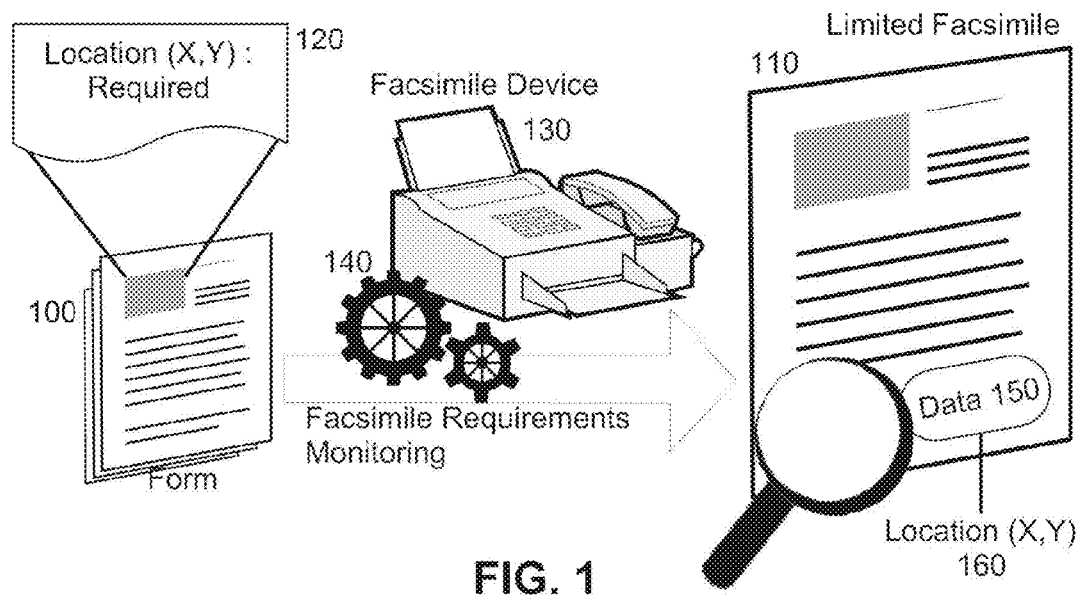
FIG. 1
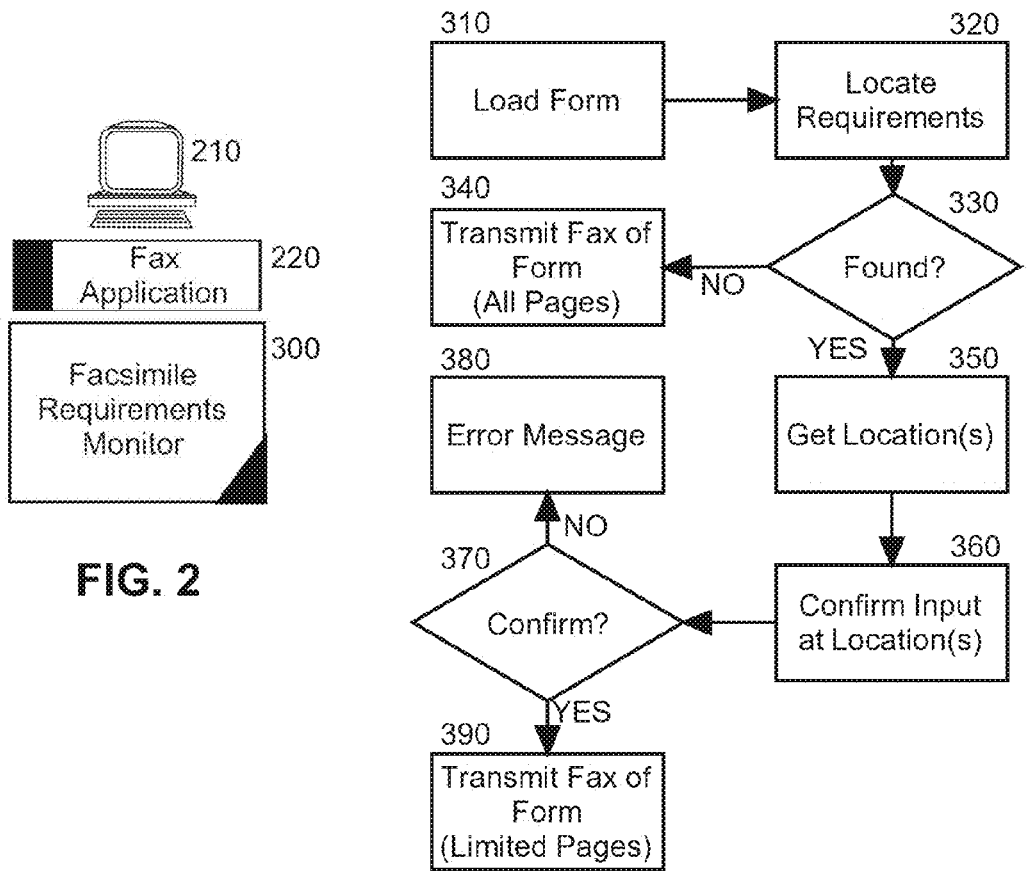
FIG. 2
FIG. 3

FACSIMILE REQUIREMENTS MONITORING

BACKGROUND OF THE INVENTION

Field of the Invention

The present invention relates to facsimile processing and more particularly to determining facsimile requirements when processing a facsimile.

Description of the Related Art

Traditionally, documents have been exchanged between parties by way of hand delivery, postal service, or facsimile. More recently, the public Internet has become a highly effective medium through which electronic documents have been exchanged, particularly as attachments to electronic mail. Still, in many occasions, the use of electronic mail cannot provide an adequate medium for document transfer. Specifically, where the original copy of a document is in a hard copy format, with handwritten or non-textual elements, a facsimile device can be the preferred tool of document exchange.

Facsimile devices ordinarily exchange facsimile data with other facsimile devices over the public switched telephone network (PSTN). Specifically, as in the case of an ordinary telephone call, the calling facsimile device can establish a communicative link over the PSTN to a receiving facsimile device. Each of the devices can negotiate suitable data exchange protocols and the transfer of facsimile data can commence. Upon completion of the exchange, the received facsimile data can be transposed to hard copy form and the call can terminate. Of note, several technologies have been developed with which facsimile data can be exchanged between facsimile devices not over the PSTN, but over the public Internet. Referred to in the art as "IP faxing", facsimile data can be packetized and forwarded across the Internet to a network node local to the facsimile recipient.

Of note, oftentimes, a document to be transmitted by facsimile is a form requiring completion of different fields, including informational fields as well as one or more signature fields. In this circumstance, it is intended that the end user complete all required fields of the document and return by facsimile at least those pages with the required fields. Yet, in the case where there are multiple pages of the document, occasionally the end user will neglect to complete all required fields prior to returning the document by facsimile. Consequently, upon discovering the incomplete nature of the document, the end user will be required to complete the missing fields of the form and retransmit a new facsimile of the document—a wasteful exercise. Further, to the extent that some pages of the document do not include any of the fields requiring completion, transmitting by facsimile those pages also can be wasteful.

BRIEF SUMMARY OF THE INVENTION

Embodiments of the present invention address deficiencies of the art in respect to facsimile transmission of forms and provide a novel and non-obvious method, system and computer program product for facsimile requirements monitoring during facsimile transmission of a form. In an embodiment of the invention, a method of facsimile requirements monitoring during facsimile transmission of a form is provided. The method includes loading a document directed for facsimile transmission by a facsimile data processing system, identifying within the document a facsimile requirement that a particular location within the document include end user supplied data, determining whether or not the particular location specified by the facsimile requirement includes end user supplied data, and generating an error message in the facsimile device responsive to a determination that the particular location lacks any end user supplied data.

In one aspect of the embodiment, the method additionally includes transmitting a facsimile image of only a set of pages of the document that include locations specified by the facsimile requirement and omitting from transmission pages of the document that do not include locations specified by the facsimile requirement. In another aspect of the embodiment, the facsimile requirement is encoded in a bar code embedded in the document, or the facsimile requirement is encoded in a quick response code embedded in the document. In yet another aspect of the embodiment, the particular location is specified in the facsimile requirements as coordinates of a page of the document. In event yet another aspect of the embodiment, a transmission of a facsimile image of the document is aborted responsive to a determination that the particular location lacks any end user supplied data.

In another embodiment of the invention, a facsimile data processing system is configured for facsimile requirements monitoring during facsimile transmission of a form. The system includes a host computing device with memory and at least one processor, a fax application executing in the memory of the host computing device, and a facsimile requirements monitor coupled to the fax application. The monitor includes program code enabled to load a document directed for facsimile transmission by the fax application, to identify within the document a facsimile requirement that a particular location within the document include end user supplied data, to determine whether or not the particular location specified by the facsimile requirement includes end user supplied data, and to generate an error message in the host computing device responsive to a determination that the particular location lacks any end user supplied data.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for facsimile requirements monitoring during facsimile transmission of a form;

FIG. 2 is a schematic illustration of a facsimile data processing system configured for facsimile requirements monitoring during facsimile transmission of a form; and, FIG. 3 is a flow chart illustrating a process for facsimile requirements monitoring during facsimile transmission of a form.

DETAILED DESCRIPTION OF THE INVENTION

Embodiments of the invention provide for facsimile requirements monitoring during facsimile transmission of a form. In accordance with an embodiment of the invention, facsimile requirements can be imprinted upon a form. The requirements can include, by way of example, the location in the form of required fields, or a listing of pages of the form that include required fields. Thereafter, when processing the form within a facsimile device, the requirements can be identified and processed and a determination can be made as to whether or not the requirements of the form have been met. Optionally, the transmission of a facsimile of the form can be aborted in the event that required fields are not completed. Further, the transmission of a facsimile of the form by the facsimile device can be limited based upon the requirements including limiting the transmission of a facsimile of only those pages of the form indicated by the requirements as including required fields.

In further illustration, FIG. 1 pictorially shows a process for facsimile requirements monitoring during facsimile transmission of a form. As shown in FIG. 1, a form 100 can include embedded therein facsimile requirements 120 indicating one or more locations 160 within the form 100 of data fields that require data input. The facsimile requirements 120 can be specified plainly within the form 100 and demarcated as the facsimile requirements 120, or the facsimile requirements 120 can be encoded within an image such as a bar code or quick response code. For example, the facsimile requirements 120 can specify coordinates and one or more page numbers corresponding to a location or area in the form 100 required to be completed. Also, the facsimile requirements 120 can specify which of the pages of the form are required to be transmitted in a single transmission.

During the attempted facsimile transmission of the form 100 by way of a facsimile device 130, facsimile requirement monitoring logic 140 can identify the facsimile requirements 120 and determine whether or not each specified location 160 of the form 100 includes data 150 completed within a corresponding field. If not, the facsimile requirements monitoring logic 140 can indicate an error condition within the facsimile device 130 for the benefit of the end user and the transmission of a facsimile of the form 100 can be delayed or aborted. Optionally, each page of the form 100 in which an incomplete area is detected based upon the facsimile requirements 120 can be printed with the incomplete area visually emphasized. Alternatively, a display panel of the facsimile device 130 can be used to display an indication of the incomplete area of the form 100. As even yet another alternative, the display panel can permit an end user to affirmatively override one or more of the facsimile requirements 120 in respect to a detected incomplete area of the form 100.

Otherwise, a facsimile of the form 100 can be transmitted by the facsimile device 130. Optionally, only those pages 110 of the form 100 that include one or more required fields indicated by the facsimile requirements 120 can be transmitted by the facsimile device 130.

The process described in connection with FIG. 1 can be implemented within a facsimile data processing system. In yet further illustration, FIG. 2 schematically shows a facsimile data processing system configured for facsimile requirements monitoring during facsimile transmission of a form. The system can include a host computing device 210, such as a personal computer, computing server or an embedded computing system disposed within a facsimile device. In all cases, at least one processor and memory can be provided. The host computing device 210 can support the operation of a fax application 220.

The fax application 220 can be a computer program executing in the memory of the host computing device 210 and providing facsimile transmission capabilities including the loading of an image of a document, whether acquired through optical scanning or by way of a file system, the conversion of the image to a facsimile format such as the well known tagged image file format or its many variants, and the communicative transmission either by way of the public switched telephone network or the global Internet (or both) of the image to a specified destination.

Finally, the system can include a facsimile requirements monitor 300. The facsimile requirements monitor 300 can include program code enabled upon execution in the memory of the host computing device 210 to identify facsimile requirements within a document loaded for facsimile transmission in the fax application 220. The program code additionally can be enabled to determine one or more locations within the document of fields that are required to be completed. The program code yet further can be enabled to inspect the location or locations referenced by the facsimile requirements to ensure that the locations include data.

Finally, the program code can be enabled to generate an error message in a display of the host computing device 210 responsive to a determination that one or more of the locations referenced by the facsimile requirements lacks required data. Optionally, even if all locations referenced by the facsimile requirements include required data, the program code can be enabled to direct the transmission of a facsimile image only of those pages of the document including the locations referenced by the facsimile requirements.

In even yet further illustration of the operation of the facsimile requirements monitor 300, FIG. 3 is a flow chart illustrating a process for facsimile requirements monitoring during facsimile transmission of a form. Beginning in block 310, a form can be loaded in memory of a facsimile device for transmission to a specified destination. In block 320, facsimile requirements can be located in the loaded form. For instance, a bar code or quick response code that encodes the requirements can be identified by image processing logic within the form. In decision block 330, if facsimile requirements are not located within the form, in block 340 a facsimile of the entire form can be transmitted by the facsimile device. Otherwise, the process can continue through block 350.

In block 350, one or more locations within the form can be identified based upon the facsimile requirement. Thereafter, the image processing logic can analyze an area defined by, surrounding, or proximate to each location to determine if any data exists at the location. In decision block 370 to the extent that a location lacks data though referenced in the facsimile requirements as required, in block 380 an error message can be presented in the facsimile device. Otherwise, in block 390 a facsimile only of those pages of the form that include the location or locations referenced by the facsimile requirements can be transmitted by the facsimile device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of facsimile requirements monitoring during facsimile transmission of a form, the method comprising:
    loading a document directed for facsimile transmission by a facsimile data processing system;
    identifying within the document an encoded facsimile requirement that a particular location within the document include end user supplied data and not be left incomplete without any end user supplied data;
    determining whether or not the particular location specified by the facsimile requirement includes end user supplied data such that the particular location has not been left incomplete without any end user supplied data and has in fact been completed with some end user supplied data;
    generating an error message in the facsimile data processing system responsive to a determination that the particular location is devoid of any end user supplied data and is thus incomplete; and,
    transmitting a facsimile image of only a set of pages of the document that include locations specified by the facsimile requirement, and
    displaying a prompt in a user interface of the facsimile data processing system for an end user to override the facsimile requirement for a document that includes the particular location that lacks any end user supplied data; and,
    responsive to a receipt of an override directive for the facsimile requirement in the prompt, facsimile transmitting a page of the document that includes the particular location despite the particular location having been determined to not include end user supplied data.

2. The method of claim 1, wherein the facsimile requirement is encoded in a bar code embedded in the document.

3. The method of claim 1, wherein the facsimile requirement is encoded in a quick response code embedded in the document.

4. The method of claim 1, wherein the particular location is specified in the facsimile requirements as coordinates of a page of the document.

5. The method of claim 1, wherein a transmission of a facsimile image of the document is aborted responsive to a determination that the particular location lacks any end user supplied data.

6. A facsimile data processing system configured for facsimile requirements monitoring during facsimile transmission of a form, the system comprising:
    a host computing device with memory and at least one processor;
    a fax application executing in the memory of the host computing device; and,
    a facsimile requirements monitor coupled to the fax application, the facsimile requirements monitor comprising program code enabled to load a document directed for facsimile transmission by the fax application, to identify within the document an encoded facsimile requirement that a particular location within the document include end user supplied data and not be left incomplete without any end user supplied data,
    to determine whether or not the particular location specified by the facsimile requirement includes end user supplied data such that the particular location has not been left incomplete without any end user supplied data and has in fact been completed with some end user supplied data, and
    to generate an error message in the facsimile data processing system responsive to a determination that the particular location is devoid of any end user supplied data and is thus incomplete; and,
    to transmit a facsimile image of only a set of pages of the document that include locations specified by the facsimile requirement and
    to display a prompt in a user interface of the facsimile data processing system for an end user to override the facsimile requirement for a document that includes the particular location that lacks any end user supplied data; and,
    responsive to a receipt of an override directive for the facsimile requirement in the prompt, facsimile transmitting a page of the document that includes the particular location despite the particular location having been determined to not include end user supplied data.

7. The system of claim 6, wherein the facsimile requirement is encoded in a bar code embedded in the document.

8. The system of claim 6, wherein the facsimile requirement is encoded in a quick response code embedded in the document.

9. The system of claim 6, wherein the particular location is specified in the facsimile requirements as coordinates of a page of the document.

10. The system of claim 6, wherein a transmission of a facsimile image of the document by the fax application is aborted responsive to a determination that the particular location lacks any end user supplied data.

11. A computer program product for facsimile requirements monitoring during facsimile transmission of a form, the computer program product comprising:
    a computer readable storage medium comprising a device having computer readable program code embodied therewith, the computer readable program code comprising:
    computer readable program code for loading a document directed for facsimile transmission by a facsimile data processing system;
    computer readable program code for identifying within the document an encoded facsimile requirement that a particular location within the document include end user supplied data and not be left incomplete without any end user supplied data;
    computer readable program code for determining whether or not the particular location specified by the facsimile requirement includes end user supplied data such that the particular location has not been left incomplete without any end user supplied data and has in fact been completed with some end user supplied data;
    computer readable program code for generating an error message in the facsimile data processing system responsive to a determination that the particular location is devoid of any end user supplied data and is thus incomplete; and, computer readable program code for transmitting a facsimile image of only a set of pages of the document that include locations specified by the facsimile requirement and computer readable program code for displaying a prompt in a user interface of the facsimile data processing system for an end user to override the facsimile requirement for a document that includes the particular location that lacks any end user supplied data; and, computer readable program code for responding to a receipt of an override directive for the facsimile requirement in the prompt by facsimile transmitting a page of the document that includes the particular location despite the particular location having been determined to not include end user supplied data.

12. The computer program product of claim 11, wherein the facsimile requirement is encoded in a bar code embedded in the document.

13. The computer program product of claim 11, wherein the facsimile requirement is encoded in a quick response code embedded in the document.

14. The computer program product of claim 11, wherein the particular location is specified in the facsimile requirements as coordinates of a page of the document.

15. The computer program product of claim 11, wherein a transmission of a facsimile image of the document is aborted responsive to a determination that the particular location lacks any end user supplied data.

* * * * *